United States Patent
Kim

(10) Patent No.: US 8,238,763 B2
(45) Date of Patent: Aug. 7, 2012

(54) SYSTEMS AND METHODS OF MANAGING ERRORS OF AN IMAGE FORMING APPARATUS

(75) Inventor: Su-dong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 12/796,166

(22) Filed: Jun. 8, 2010

(65) Prior Publication Data

US 2011/0150507 A1   Jun. 23, 2011

(30) Foreign Application Priority Data

Dec. 17, 2009   (KR) ................ 2009-126123

(51) Int. Cl.
*G03G 15/00* (2006.01)

(52) U.S. Cl. ............................... 399/8; 399/9

(58) Field of Classification Search ......... 399/8, 9, 399/11, 24
See application file for complete search history.

(56) References Cited

U.S. PATENT DOCUMENTS

| | | | | |
|---|---|---|---|---|
| 5,911,092 | A  * | 6/1999 | Hotta et al. | 399/8 X |
| 2002/0009302 | A1* | 1/2002 | Kodama et al. | 399/18 |
| 2006/0291871 | A1* | 12/2006 | Yamaguchi et al. | 399/8 |
| 2007/0292145 | A1* | 12/2007 | Drose et al. | 399/8 |

FOREIGN PATENT DOCUMENTS

KR   20090002456   1/2009

* cited by examiner

*Primary Examiner* — Sophia S Chen
(74) *Attorney, Agent, or Firm* — Stanzione & Kim, LLP

(57) ABSTRACT

A method of managing errors of at least one image forming apparatus, the method involving collecting information regarding the errors disrupting normal operation of the at least one image forming apparatus, analyzing the severity of each of the errors based on the collected information, and outputting a severity analysis result for each of the errors.

29 Claims, 11 Drawing Sheets

FIG. 3

| ☐ | No. | Fault Group | Fault Description |
|---|---|---|---|
| ☐ | 1 | Cover (Door) | The printer cover is open |
| ☐ | 2 | Cover (Door) | The printer cover is closed |
| ☑ | 3 | Etc. | The inter-lock is open |
| ☐ | 4 | Etc. | The inter-lock is closed |
| ☐ | 5 | Etc. | The settings have been changed |
| ☐ | 6 | Etc. | Sub-unit not installed |
| ☑ | 7 | Etc. | Sub-unit life almost over |
| ☑ | 8 | Etc. | Sub-unit life over |
| ☐ | 9 | Etc. | Sub-unit low |
| ☐ | 10 | Etc. | Sub-unit empty |
| ☑ | 11 | Etc. | Sub-unit almost at full |
| ☐ | 12 | Etc. | Sub-unit full |
| ☐ | 13 | Etc. | Sub-unit almost at limit |
| ☐ | 14 | Etc. | Sub-unit at limit |
| ☐ | 15 | Etc. | Sub-unit open |
| ☐ | 16 | Etc. | Sub-unit closed |
| ☑ | 17 | Etc. | Sub-unit on |
| ☐ | 18 | Etc. | Sub-unit off |
| ☐ | 19 | Etc. | Sub-unit offline |
| ☐ | 20 | Etc. | Sub-unit in power-saving mode |

- ▶ Device Group  [?]

Real Device Group is physical device group.
That means one device assign one group only.

- ☐ All Devices [100 of 200]
  - ☐ Ungrouped [0 of 10]
  - ☐ Grouped [100 of 190]
    - ⊞ ☐ Citi Bank [30 of 50]
      - ⊞ ☐ Chase [30 of 50]
      - ⊞ ☐ Central Bank [40 of 90]
        - ⊞ ☐ Boston [40 of 90]

502

[+] [−]  ▫▫▫

- ▶ Virtual Group  [?]

- ⊞ Model Group [100 of 200]
- ⊞ Consumable Group [100 of 200]
- ⊞ IP Range [100 of 200]
- ⊞ Customize Group [100 of 200]

[+] [−]  ▫

Device Group & List

Device > Device Group & List

2nd Floor (selected 0/Total 40)

[Export] [Print ▼] [📊]

Last updated: OCT 23, 2009 | 09 43:24  ☑ Attend Devices: 0  ⊗ Error Devices: 25  ⚠ Warning Devices: 5  [Export] New Devices: 8

| Device Configuration | Firmware Upgrade | Driver Installation | Report |

[Add] [Delete] [Edit]       All ▼      Location Map    ▲ More [12]

501

| ERROR SEVERITY | ERROR FREQUENCY ◆▶ | ERROR TREATMENT TIME ◆▶ | FAULT DESCIRPTION |
|---|---|---|---|
| Severe | High | Long | Toner low |
| Severe | High | Long | Toner empty |
| Severe | High | Long | Waste toner box almost full |
| Warning | High | Short | Waste toner box full |
| Warning | High | Short | OPC life almost over |
| Warning | High | Short | Print output tray full |
| Warning | Low | Long | Print output tray almost full |
| Warning | Low | Long | The paper tray in the printing path is almost full |
| Warning | Low | Long | An error occurred in the thermostat of the sub-unit |
| Slight | Low | Short | Sub-unit almost at limit |
| Slight | Low | Short | The printer cover is open |
| Slight | Low | Short | The inter-lock is open |
| Slight | Low | Short | Sub-unit low |
| Slight | Low | Short | Sub-unit life over |

☐ Display devices from sub groups | 1/2 page    ◀◀ Previous | 1 2 | Next ▶▶    LIST [20]  ▶

FIG. 5B

Device Group

Real Device Group is physical device group.
That means one device assign one group only.

- All Devices [100 of 200]
  - Ungrouped [0 of 10]
  - Grouped [100 of 190]
    - ⊞ Citi Bank [30 of 50]
    - ⊟ Chase [30 of 50]
      - ⊞ Central Bank [40 of 90]
      - ⊞ Boston [40 of 90]   ← 512

Virtual Group

- ⊞ Model Group [100 of 200]
- ⊞ Consumable Group [100 of 200]
- ⊞ IP Range [100 of 200]
- ⊞ Customize Group [100 of 200]

---

Device Group & List                                              Device > Device Group & List

2nd Floor (detected 0/Total 40)                    [Export] [Print]

Last updated: OCT 23, 2009 | 09:43:24  ☑ Attend Devices: 0  ⊗ Error Devices: 25  ⚠ Warning Devices: 5  [NEW] New Devices: 8

[Device Configuration] [Firmware Upgrade] [Driver installation] [Report]      [All ▼] Location Map    ▲ More[12]

[Add] [Delete] [Ect]                                                            [🔍▼] [Filter All ▼]

| Location | Model Name | IP | Severe | Warning | Slight |
|---|---|---|---|---|---|
| 34F-Planning Dept. | ML-4551 | 10.88.112.11 | 5 | 1 | 1 |
| 34F-Planning Dept. | ML-4551 | 10.88.113.24 | 5 | 0 | 1 |
| 34F-Planning Dept. | SCX-5530 | 10.88.117.123 | 4 | 2 | 2 |
| 30F-R&D Dep. | SCX-5530 | 10.88.119.22 | 4 | 1 | 1 |
| 30F-R&D Dep. | CLX-8380 | 10.88.118.101 | 4 | 2 | 0 |
| 29F-MKT. Dept. | ML-4551 | 10.88.122.21 | 3 | 2 | 1 |
| 29F-MKT. Dept. | ML-4551 | 10.88.189.99 | 3 | 2 | 0 |
| 29F-MKT. Dept. | CLX-8380 | 10.88.122.77 | 3 | 2 | 0 |
| 29F-MKT. Dept. | SCX-6345 | 10.88.148.155 | 2 | 2 | 1 |
| 29F-MKT. Dept. | SCX-6345 | 10.88.122.168 | 2 | 1 | 1 |
| 36F-Strategy Dept. | ML-4551 | 10.88.133.33 | 1 | 1 | 0 |
| 36F-Strategy Dept. | CLP-660 | 10.88.164.210 | 1 | 1 | 2 |
| 36F-Strategy Dept. | CLP-660 | 10.88.122.55 | 1 | 1 | 0 |

☐ Display devices from sub groups | 1/2 page       ▼ Previous | 1 2 | Next ▲▲            LIST [20 ▼]

↑ 511

SYSTEMS AND METHODS OF MANAGING ERRORS OF AN IMAGE FORMING APPARATUS

CROSS-REFERENCE TO RELATED APPLICATIONS

This application claims priority under 35 U.S.C. §119 from Korean Patent Application No. 10-2009-0126123, filed on Dec. 17, 2009, in the Korean Intellectual Property Office, the disclosure of which is incorporated herein in its entirety by reference.

BACKGROUND

1. Field of the Invention

The present general inventive concept relates to a server to manage an image forming apparatus and a method and system of managing errors of the image forming apparatus.

2. Description of the Related Art

Enterprise printing account solutions are typically connected to image forming apparatuses such as a printer, a multi-function peripheral, and the like through a network to collect error information of currently-operating image forming apparatuses to monitor and manage print jobs and other image forming operations. The printing account solution analyzes the collected error information and shows the error information of the image forming apparatuses to a service provider managing the image forming apparatuses or a customer manager through a web application of the solution. After identifying if the error information is urgent and determining a proper measuring method, the service provider or the customer manager takes appropriate and just and proper measures to manage the errors of the image forming apparatuses. That is, by analyzing in real time operational states of the currently-operating image forming apparatuses, the enterprise printing account solution enables the image forming apparatuses purchased by customers to be continuously managed.

SUMMARY

The present general inventive concept is directed to a server to manage an image forming apparatus and a method and system to manage errors of the image forming apparatus.

Additional embodiments of the present general inventive concept will be set forth in part in the description which follows and, in part, will be obvious from the description, or may be learned by practice of the general inventive concept.

According to an embodiment of the present general inventive concept, there is provided a method of managing errors of at least one image forming apparatus, the method including the operations of collecting information regarding the errors disrupting normal operation of the at least one image forming apparatus, calculating an occurrence frequency of each of the errors of the at least one image forming apparatus and a treatment time taken to treat each of the errors of the at least one image forming apparatus using the collected information, analyzing the severity of each of the errors based on at least one of the occurrence frequency and the treatment time, and outputting a severity analysis result for each of the errors.

According to another embodiment of the present general inventive concept, there is provided a computer readable recording medium having recorded thereon a computer program to execute the method of managing errors of at least one image forming apparatus.

According to another embodiment of the present general inventive concept, there is provided a server to manage at least one image forming apparatus, including a storage unit to collect information regarding the errors which disrupt normal operation of the at least one image forming apparatus and to store the collected information therein, a calculating unit to calculate an occurrence frequency of each of the errors of the at least one image forming apparatus and a treatment time taken to treat each of the errors of the at least one image forming apparatus using the collected information, an analyzing unit to analyze severity of each of the errors based on at least one of the occurrence frequency and the treatment time, and an outputting unit to output a severity analyzing result for each of the errors.

According to another embodiment of the present general inventive concept, there is provided a system of managing errors of at least one image forming apparatus, including an image forming apparatus managing server to manage the at least one image forming apparatus, and a network to connect the at least one image forming apparatus to the image forming apparatus managing server, wherein the image forming apparatus managing server includes a storage unit to collect information regarding the errors which disrupt normal operation of the at least one image forming apparatus and to store the collected information therein, a calculating unit to calculate an occurrence frequency of each of the errors of the at least one image forming apparatus and a treatment time taken to treat each of the errors of the at least one image forming apparatus using the collected information, an analyzing unit to analyze severity of each of the errors based on at least one of the occurrence frequency and the treatment time, and an outputting unit to output a severity analysis result for each of the errors.

Embodiments of the present general inventive concept may also be achieved by providing a method of managing errors of an image forming apparatus, the method including receiving error information of the image forming apparatus, prioritizing the error information based on an occurrence frequency of the errors and a treatment time to solve the errors, and outputting a severity analysis report for each of the errors based on the occurrence frequency and the treatment time of the errors.

The error information can be received remotely from the image forming apparatus.

The prioritizing of the error information can occur immediately after the error occurs.

The method may further include setting an error occurrence reference value and an error treatment reference value, wherein the prioritizing the error information comprises comparing the error occurrence reference and the error treatment reference to the occurrence frequency and the treatment time, respectively.

The prioritizing of the error information can further include applying different weights to the occurrence frequency and the treatment time.

Embodiments of the present general inventive concept may also be achieved by providing a printing account server to manage errors of at least one image forming apparatus, including a receiving unit to receive error information of the image forming apparatus, a processor to prioritize the error information based on an occurrence frequency of the error and a treatment time to solve the errors, and an output unit to output a severity analysis report for each of the errors based on the occurrence frequency and the treatment time of the errors.

The error information can be received remotely from the image forming apparatus via a network.

The processor can prioritize the error information immediately after the error occurs.

The printing account server can further include an input unit to set an error occurrence reference value and an error treatment reference value, wherein the processor prioritizes the error information by comparing the error occurrence reference value and the error treatment reference value to the occurrence frequency and the treatment time, respectively.

The processor can apply different weights to the occurrence frequency and the treatment time to prioritize the error information.

BRIEF DESCRIPTION OF THE DRAWINGS

The above and/or other features and embodiments of the present general inventive concept will become apparent and more readily appreciated from the following description of the exemplary embodiments, taken in conjunction with the accompanying drawings, in which:

FIG. 3 is a view illustrating setting of error items in an error item setting unit, according to an embodiment of the present general inventive concept;

FIG. 5A is a view illustrating a report output from an output unit, according to an embodiment of the present general inventive concept;

FIG. 5B is a view illustrating a report output from the output unit, according to an embodiment of the present general inventive concept;

DETAILED DESCRIPTION OF THE EMBODIMENTS

Figure 1:
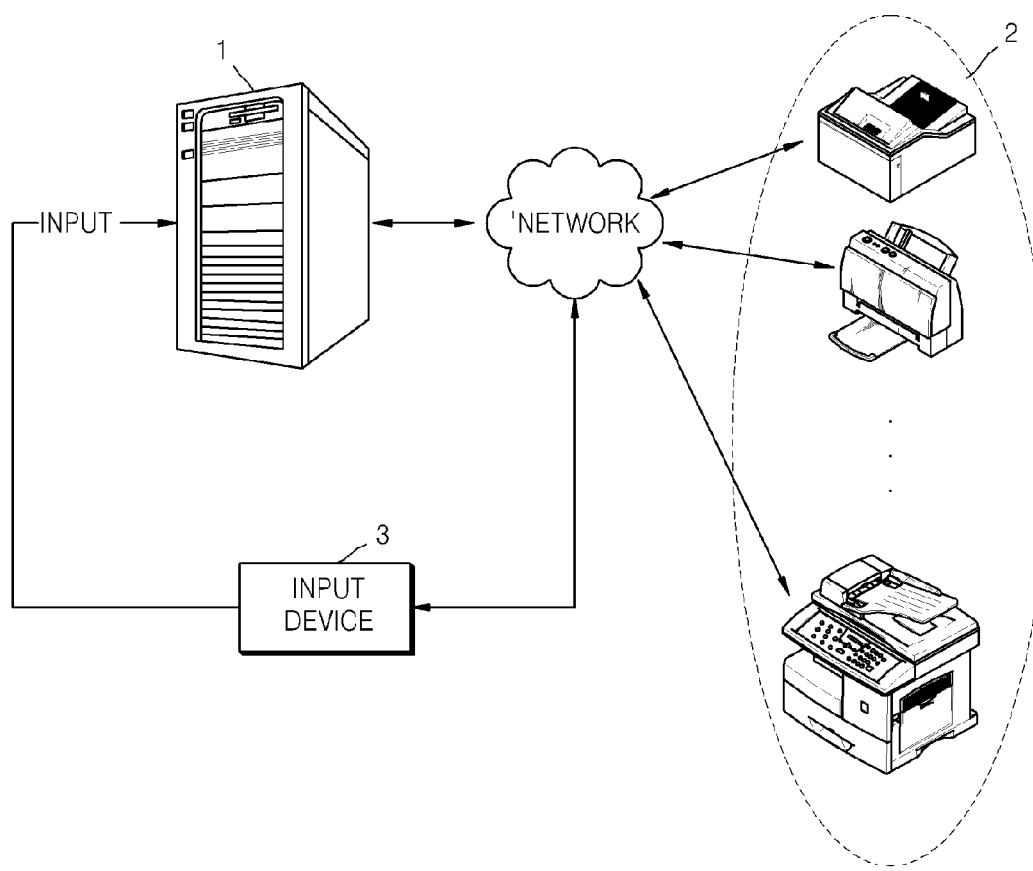
FIG. 1 is a schematic view of a system to manage errors of image forming apparatuses, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a schematic view of a system of managing errors of image forming apparatuses, according to an exemplary embodiment of the present general inventive concept. Referring to FIG. 1, a printing account server 1 is connected to image forming apparatuses 2 through a network. Here, the network may be a wired or wireless network. The image forming apparatuses 2 may include a printer and/or a multi-function peripheral having a printing function, copying function, scanning function, and fax function. It is possible that the printing account server 1 and an image forming apparatus 2 may be formed in a single body, and other types of peripheral devices may be included or connected with the printing account server 1 and image forming apparatuses without departing from the principles and spirit of the present general inventive concept.

Referring to FIG. 1, the printing account server 1 is a server capable of providing a service such as an enterprise printing account solution. That is, the printing account server 1 is configured to manage the image forming apparatuses 2 connected to the printing account server 1 through the network using the printing account solution. The printing account server 1 provides continuous management of the image forming apparatuses 2 purchased by customers by correcting and analyzing error information of the image forming apparatuses 2 so that the customers can normally use the their image forming apparatuses 2. Generally, the printing account server 1 is used by a service provider or customer manager to manage the image forming apparatuses 2.

The printing account server 1 may receive information from a manufacturer, manager or user through a separate input device 3 which may be configured as a terminal device such as a personal computer or other types of input devices connected to the printing account server 1 to communicate with the printer account server 1 and/or image forming apparatuses 2 to form or print an image on a print medium. It will be understood by those skilled in the art that the present general inventive concept is not limited to the illustrated configuration, and that various other types of connections and input units may also be used without departing from the broader principles and features of the present general inventive concept.

For example, it is possible for manufacturers to sell image forming apparatuses 2 to corporations in large quantities through a Business-to-Business (B2B) solution. Here, the manufacturers can use the printing account server 1 to remotely inspect errors of the image forming apparatuses 2 and to treat the errors through a wired or wireless network to perform after-sale service of the image forming apparatuses. Typically, the printing account server 1 uses software such as the previously described enterprise printing account solution or other systems to monitor and manage the errors of the image forming apparatuses 2.

In a typical enterprise printing account solution, error severity is set for all of error items generated in the image forming apparatuses, and the error information is sent to the printing account server 1 in accordance with the error severity—unless the manager changes the severity of the error. However, in this case, it is possible that an error that is not serious may be nonetheless considered as a serious error and sent to the printing account server 1, thus using valuable time and resources. Accordingly, the typical enterprise printing account system can have the following limitations.

Since the manager is relied upon to designate the error severity for many error items, the manager may make a mistake in designating the severity for some of the error items. In addition, since the error severity and level of the experience error data are arbitrarily adjusted depending on the ability and determination of the manager, the designation of the severity is not objective. Further, since the error severity is not adjusted immediately after the error occurs but adjusted periodically or at a predetermined time, the result that is analyzed in accordance with correct error severity may be delayed and sent late.

Therefore, in order to efficiently analyze error severity, the manager such as the service provider and the customer manager should periodically change the error severity for each of the error items based on the error information of the image forming apparatuses 2, which is obtained while operating the enterprise printing account solution in the printing account server 1.

In order to address such limitations of typical systems, the printing account server 1 of the present general inventive concept is configured to objectively analyze the error severity for the error items, prioritize the error items, and provide information about the same in real time. Accordingly, more accurate and timely information can be provided for the service provider or the customer manager, and thus the service provider or the customer manager may quickly take appropriate measures to manage the errors incurred.

Figure 2:
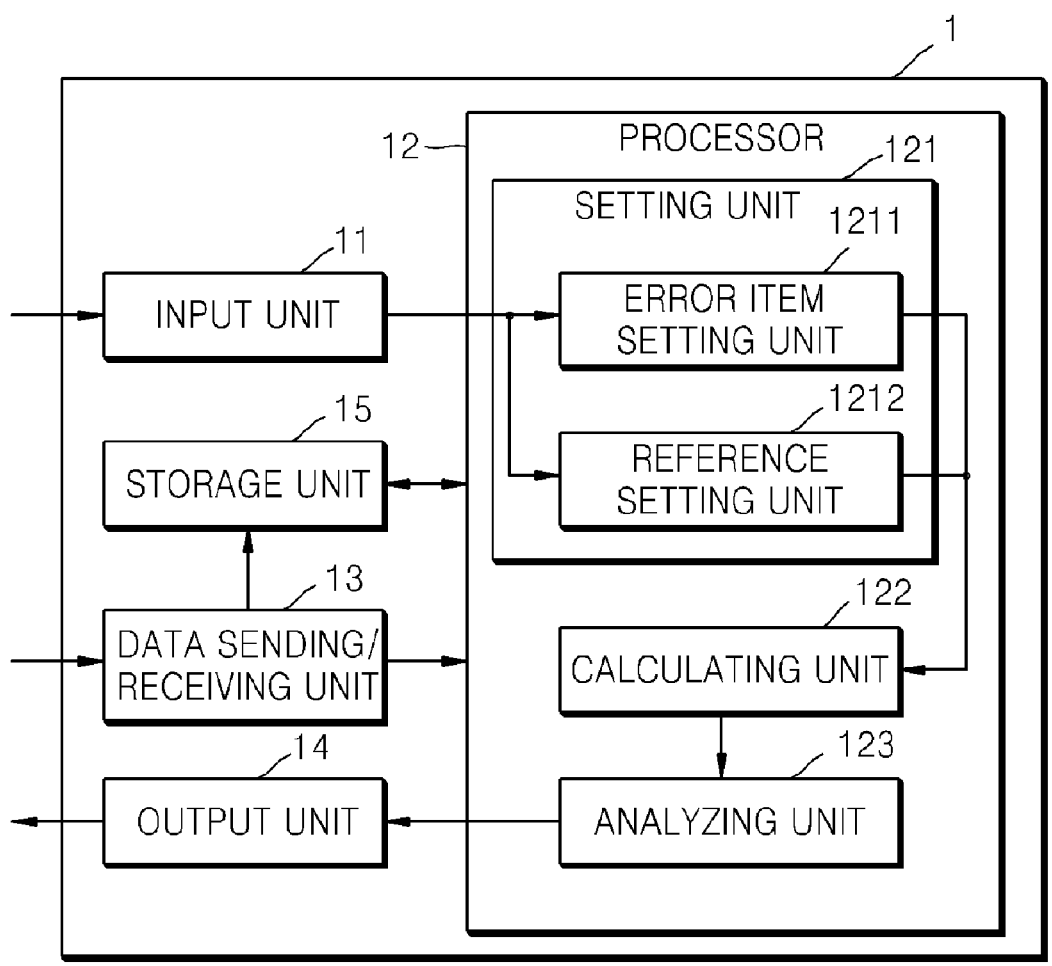
FIG. 2 is a detailed view of a printing account server of FIG. 1, according to an embodiment of the present general inventive concept.

FIG. 2 is a detailed view of the printing account server 1 of FIG. 1, according to an example embodiment of the present general inventive concept. Referring to FIG. 2, the printing account server 1 includes an input unit 11, a processor 12, a data sending/receiving unit 13, an output unit 14, and a storage unit 15. The processor 12 includes a setting unit 121, a calculating unit 122, and an analyzing unit 123. In addition, the setting unit 121 includes an error item setting unit 1211 and a reference setting unit 1212. The input unit 11 receives a user input signal from the input device 3 (FIG. 1), which may be a terminal device, a keyboard, a mouse, a touch screen, or other known or later developed type input device to communicate an input signal from the manufacturer, manager, customer, or user to control the image forming apparatuses 2. The input unit 11 communicates with the error item setting unit 1211 and reference setting unit 1212 of the setting unit 121 to process information according to the input signal of the input device 3.

The processor 12 may be implemented by an array of a plurality of logic gates or a combination of a general-purpose microprocessor and a memory for storing a program for operating the microprocessor. However, it will be understood by those skilled in the art that the processor 12 may be implemented by other types and combinations of hardware components, and that other types and combinations of general-purpose hardware components, other than the specific hardware components illustrated in FIG. 2, may be further provided. However, for convenience of description, only the hardware components relating to the illustrated embodiments of the present general inventive concept will be described to avoid obscuring the present general inventive concept in unnecessary detail.

The input unit 11 receives information from the manager of the printing account server 1. The printing account server 1 is provided with the input device such as, for example, a keyboard, a mouse, a touch screen, or the like. The user inputs the information using the input device. Alternatively, when the printing account server 1 is connected to the terminal device such as the personal computer, the manager may input the information to the input unit 11 through the terminal device. The information input to the input unit 11 is sent to the setting unit 121, as described in more detail below.

Referring again to FIG. 2, the data sending/receiving unit 13 communicates with the network to send and receive information to and from the image forming apparatuses 2. For example, the data sending/receiving unit 13 communicates with the network to collect information regarding errors of the image forming apparatuses 2, such as errors disturbing normal operation of the image forming apparatuses 2. Such errors can include, for example, information about toner status, paper status, output tray status, printer cover status, subunit status, or other types of errors that possibly disturb normal operation of the image forming apparatuses 2. The collected error information is stored in the storage unit 15 and the processor 12 reads and uses the information whenever necessary. The error information can be sent from the image forming apparatuses 2 periodically or when the manager requests.

As illustrated in FIG. 2, the setting unit 121 includes the error item setting unit 1211 and the reference setting unit 1212.

The error item setting unit 1211 sets error items that will be managed by a server managing the image forming apparatuses 2. In more detail, there are many different types of errors that can be incurred in the image forming apparatuses 2. For example, the errors mean states where the image forming apparatuses 2 cannot normally perform the image forming operation due to, for example, a cover being open or toner shortage. The printing account server 1 can display all of the error items to the manager through a display unit (not illustrated) provided on the printing account server 1. It is also possible that the printing account server 1 can communicate a listing or report of error items to another device of the network for display and/or use by the manager user. The manager may select all or some of the error items and input the selected error items through the input device. The input error items are sent to the error item setting unit 1211. The error item setting unit 1211 can set the error items such that only the input error items are managed. However, it will be understood by those of ordinary skill in the art that the error items may be set with default settings. The printing account server 1 analyzes the error severity for the set error items and/or for the error items with the default settings.

The setting of the error items in the error item setting unit 1211 will be described hereinafter with reference to FIG. 3.

FIG. 3 is a view illustrating setting of error items in the error item setting unit 1211, according to an embodiment of the present general inventive concept. Referring to FIG. 3, a plurality of error items 301 and check boxes 302 are provided so the manager can select desired error items among the error items 301 by checking the appropriate check boxes 302. When the manager selects the check boxes 302 corresponding to desired error items, the error item setting unit 1211 sets the error items such that only the selected error items are managed.

Referring again to FIG. 2, the reference setting unit 1212 sets an error occurrence frequency reference and an error treatment time reference. The reference setting unit 1212 sets an error occurrence frequency reference corresponding to a level of the error occurrence frequency (representing the number of same errors) to determine a level of error severity of each of the errors in the error items, and the reference setting unit 1212 sets a time-based reference corresponding to a level of an error treatment time taken to treat the errors.

In this example embodiment, the error severity is determined based on the error occurrence frequency and the error treatment time for the errors that occurred in the image forming apparatuses 2. The references for determining the error severity can be information input by the manager through the input device or can be set to predetermined default values. The input unit 11 can recognize the input reference information and can send the reference information to the reference setting unit 1212. Example methods of setting the references in the reference setting unit 1212 will be described hereinafter with reference to FIGS. 4A and 4B.

Figure 4A:
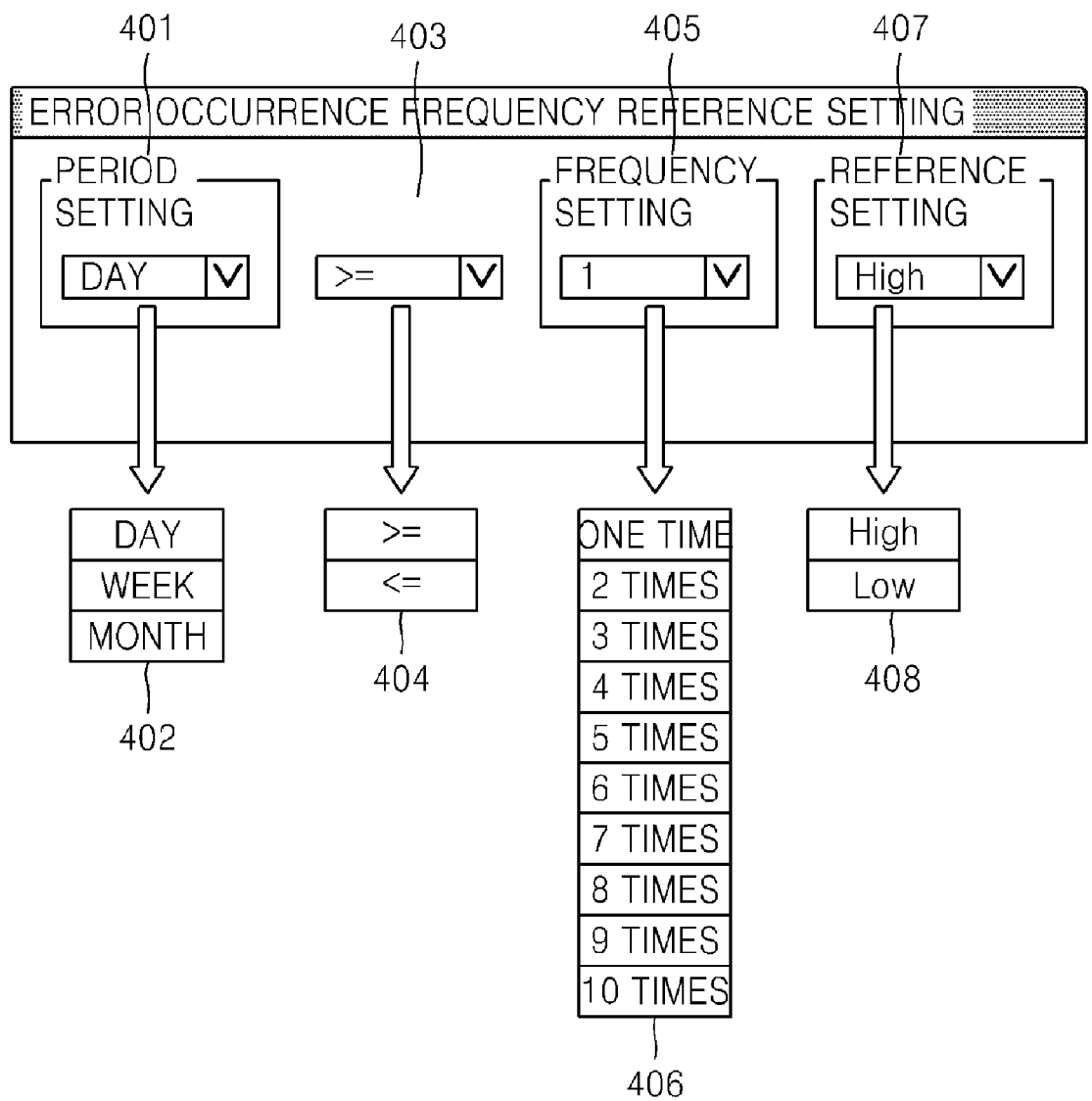
FIG. 4A is a view illustrating setting of a reference based on which a level of an error occurrence frequency is determined, according to an embodiment of the present general inventive concept.

FIG. 4A is a view illustrating a method of setting of a reference based on which a level of an error occurrence frequency is determined, according to an embodiment of the present general inventive concept. Referring to FIG. 4A, the reference setting unit 1212 sets a reference period for which error occurrence will be inspected for the reference based on which the level of the error occurrence frequency is determined and a reference frequency 405 with which an actual error occurrence frequency for the reference period will be compared.

For example, the reference setting to determine the level of the error occurrence frequency is a reference setting based on which the level of the error occurrence frequency is classified into a high level HIGH and a low level LOW. The reference setting unit 1212 sets the reference frequency based on which the frequency of the errors occurring for a reference period 401 is determined as HIGH or LOW. The reference period 401 may be set as any period of time, such as DAY, WEEK, or MONTH through a list 402 of the reference period 401. The reference frequency may be set through a list 406 of the reference frequency 405. In addition, the reference may be set as "above or equal to? (>=)" or "below or equal to? (<=)" through a list 404 of a calculation 403. The level may be set as HIGH or LOW through a list 408 of an error occurrence frequency determination 407. However, it will be understood by those skilled in the art that other terminologies may be used in the list 408 or the number of items in the list 408 may be further increased.

For example, the reference period 401 may be set as DAY, the calculation 403 may be set as "above or equal to (>=)," the reference frequency 405 may be set as 7, and the error occurrence frequency determination 407 may be set as HIGH. At this point, if the error actually occurs 7 times per day, the analyzing unit 123 determines the level of the error occurrence frequency as HIGH.

The reference for determining the level of the error occurrence frequency may be set by the manager or set as a default value stored in the storage unit 15.

Figure 4B:
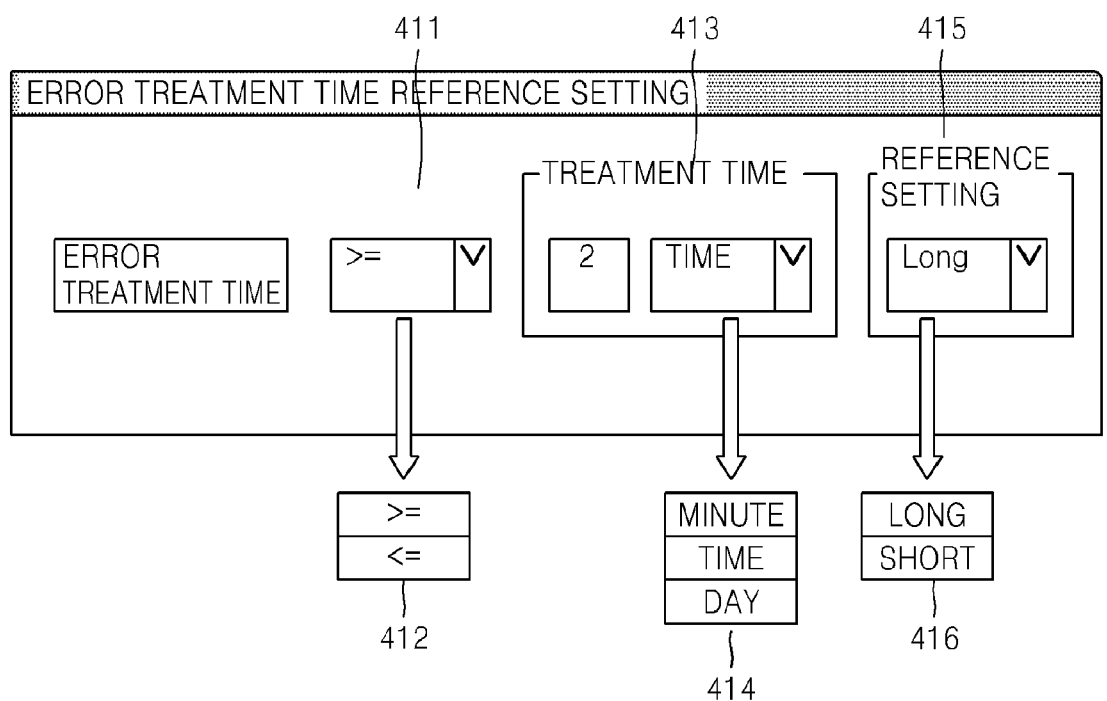
FIG. 4B is a view illustrating setting of a reference based on which a level of an error treatment time is determined, according to an embodiment of the present general inventive concept.

FIG. 4B is a view illustrating setting of a reference for determining a level of an error treatment time, according to an embodiment of the present general inventive concept. Referring to FIGS. 2 and 4B, the reference setting unit 1212 sets a reference time 413 which is compared with a time that is actually taken to treat the errors.

For example, the reference for determining a level of the error treatment time is for classifying the error treatment time into LONG and SHORT. That is, the reference setting unit 1212 sets the reference time based on which the time from an error occurrence to an error treatment completion is determined as LONG or SHORT. The number and units of time for the reference time 413 are set. A list 414 of time units may include Minutes, Hours, and Days. In addition, a list 412 of a calculation 411 may include "above or equal to (>=)" and "below or equal to (<=)." A list 416 of the error treatment time determination may include LONG and SHORT. It will be understood by those skilled in the art that other terminologies may be used in the list 408 or the number of items in the list 408 may be further increased.

Here, the reference time 413 may be set as 2 hours, the calculation 411 may be set as "above or equal to (>=)," and an error occurrence frequency determination 415 may be set as LONG. At this point, when the time from the error occurrence to the error treatment completion is 2 hours or more, the analyzing unit 123 determines the error treatment time as LONG. When the time from the error occurrence to the error treatment completion is less than 2 hours, the analyzing unit 123 determines the error treatment time as SHORT.

The reference setting to determine the level of the error treatment time may be set by the manager or set as a default value stored in the storage unit 15.

Referring again to FIG. 2, an occurrence frequency of each error occurring in the image forming apparatuses 2 and a time taken to treat the error are calculated. That is, the calculating unit 122 calculates an actual frequency of each of the errors for the reference period and an actual time taken to treat each of the errors.

The analyzing unit 123 analyzes the severity of each error based on the actual error occurrence frequency and the actual error treatment time. That is, the analyzing unit 123 compares the set references with the calculated actual error occurrence frequency and the actual error treatment time and analyzes the severity of each of the errors by determining severity levels of each of the errors based on the comparison results. For example, the analyzing unit 123 analyzes the severity of each of the errors by determining the severity levels of each of the errors in proportion to the level of the actual error occurrence frequency and the level of the actual error treatment time. Here, in order to determine the severity level, the analyzing unit 123 first determines the levels of the actual error occurrence frequency and actual error treatment time based on the comparison results and then determines the severity levels based on the determined levels. For instance, the analyzing unit 123 determines an error item having the highest actual error occurrence frequency and the longest actual error treatment time as having the highest error severity and determines an error item having the lowest actual error occurrence frequency and the shortest actual error treatment time as having the lowest error severity. The levels may be classified into two or more levels depending on the severity. The actual number of levels and classifications thereof may be adjusted depending on the use environment of the user.

To further explain the principles and features of present general inventive concept, an exemplary embodiment implementing the reference setting unit 1212 of FIG. 4A will be described. For example, suppose an error occurred two times on Sep. 11, 2009 and the error treatment time from the error occurrence to the treatment completion was 12 hours. Suppose the error further occurred 9 times on September 12 and the error treatment time from the error occurrence to the treatment completion was 23 hours. Suppose the error further occurred 12 times on September 13 and the error treatment time from the error occurrence to the treatment completion was 8 hours. Suppose the error further occurred 5 times on September 14 and the error treatment time from the error occurrence to the treatment completion was 5 hours. Suppose the error further occurred 9 times on September 15 and the error treatment time from the error occurrence to the treatment completion was 7 hours.

In this case, the reference period set in FIG. 4A is one day DAY, and a mean error occurrence frequency for one day is a value attained by dividing the total error occurrence frequency by the number of days in total. That is, the total error occurrence frequency is 2+9+12+5+9=37 times and the number of the days in total is 5. Therefore, the mean error occurrence frequency for one day is calculated to be 37/5=7.4/day. The calculating unit 122 performs this calculation. Accordingly, since the reference frequency 405 set in FIG. 4A is 7 times, the analyzing unit 123 compares the calculated mean error frequency of 7.4 times with the reference frequency (7 times). From the comparison result, since 7.4 is greater than 7, the analyzing unit 123 determines the error occurrence frequency as HIGH.

In addition, the mean error treatment time for the error is a value attained by dividing the total error treatment time by the number of error occurrences in total. That is, since the total error treatment time is 55 hours and the number of error occurrences in total is 37, the mean error treatment time is 55/37=1.486 hours. The calculating unit 122 also performs this calculation. Accordingly, since the reference time 413 set in FIG. 4B is 2 hours, the analyzing unit 123 compares the 2 hours reference time with the 1.486 hours mean error treatment time. From the comparison result, since 1.486 is less than 2, the analyzing unit 123 determines the error treatment time as SHORT.

The analyzing unit 123 determines the severity level based on the error occurrence frequency level and the error treatment time level that are attained from the comparison results. Here, as described above, the error occurrence frequency level is classified into HIGH and LOW and the error treatment time level is classified into LONG and SHORT. However, it will be understood by those of ordinary skill in the art that additional frequency level ranges and classifications and other terminologies may be used to describe the levels, and the number of levels may be increased or reduced.

In more detail, the error severity is classified into a plurality of levels. In this exemplary embodiment, the error severity may be classified into "Severe," "Warning," and "Slight." The "Severe" level is a case where the error occurrence frequency is HIGH and the error treatment time is LONG. The "Warning" level is a case where the error occurrence frequency is HIGH and the error treatment time is SHORT or a case where the error occurrence frequency is LOW and the error treatment time is LONG. In addition, the "Slight" level is a case where the error occurrence frequency is LOW and the error treatment time is SHORT. The analyzing unit 123 determines the level of the error severity from the comparison results as one of the "Severe," "Warning," and "Slight." The level of the error severity may be pre-stored in the storage unit 15 or set by the manager as new levels of error severity. However, it will be understood by those skilled in the art that the number of levels of the error severity is not limited to three levels, and more or less levels may be classified depending on the use environment of the user.

The analyzing unit 123 analyzes in accordance with the above-described error severity determination with respect to the error items set by the error item setting unit 1211.

The output unit 14 outputs the analyzed severity results for each error. That is, the output unit 14 shows a report based on the analysis results to the manager through the display unit (not illustrated) of the printing account server 1 or through the terminal device such as the personal computer.

The output unit 14 outputs the report representing the errors that are sorted in higher severity level order. Alternatively, the output unit 14 outputs the report representing the image forming apparatuses 2 that are sorted in order of the higher number of the errors having the higher severity level. The report may be edited such that one of the error severity, the error occurrence frequency, and the error treatment time is output in severity order. The report may be re-sorted in accordance with the conditions the manager wants.

When the report output from the output unit 14 is displayed, the manager can identify an image forming apparatus where the severe error occurs and take appropriate measures to manage the error occurrence. That is, the manager can easily identify the image forming apparatus that should be primarily treated, and can take appropriate action to solve the error. An exemplary report output from the output unit 14 will be described with reference to FIGS. 5A and 5B.

FIG. 5A is a view illustrating an exemplary report 501 output from the output unit 14, according to an embodiment of the present general inventive concept. Referring to FIG. 5A, the output unit 14 outputs the report 501 sorted depending on the results analyzed by the analyzing unit 123.

In more detail, the report 501 of FIG. 5A is a report in which the errors of the error items set in the error item setting unit 1211 are sorted in severity order. When the image forming apparatuses 2 are classified into predetermined groups, the manager may identify the errors that are sorted in error severity order with respect to the image forming apparatuses of a group 502.

FIG. 5B is a view illustrating a report 511 output from the output unit 14, according to an embodiment of the present general inventive concept. Referring to FIG. 5B, the output unit 14 outputs the report 511 sorted depending on the results analyzed by the analyzing unit 123.

In more detail, the report 511 of FIG. 5B illustrates the image forming apparatuses 2 that are sorted in order of the higher number of severe error items with respect to the image forming apparatuses of a group 512. While the report of FIG. 5B is sorted based on the image forming apparatuses 2, the report of FIG. 5A is sorted based on the errors having the higher error severity level. The report 511 of FIG. 5B includes information regarding, for example, locations of the image forming apparatuses 2, an IP address, the number of errors, error severity, and the like. The report 511 provides the information for the manager. The manager can easily identify through the report an image forming apparatus where the severest error occurs. Therefore, the manager immediately takes just and proper measures to minimize disruption with respect to the image forming apparatus where the severest error occurs.

Referring again to FIG. 2, the storage unit 15 stores therein the information input from the input unit 11 to the printing account server 1, the information set by the setting unit 121, the results analyzed by the analyzing unit 123, the results output from the output unit 14, and the like. The storage unit 15 also stores therein a default value for the references classifying the error occurrence frequency and the error treatment time as well as the information regarding the error severity.

In the above description, operations of a printing account server 1 according to an example embodiment of the present general inventive concept, wherein the error severity can be analyzed based on the error occurrence frequency and the error treatment time. However, the present general inventive concept is not limited to such example embodiment, but instead can be implemented in any number of additional embodiments without departing from the broader principles and scope of the present general inventive concept. For example, another example embodiment of the printing account server 1 will be described below to further define the scope of the present general inventive concept.

A printing account server 1 according to another example embodiment of the present general inventive concept analyzes the error severity of the image forming apparatuses by applying weights to the error occurrence frequency and the error treatment time to further analyze the error severity.

Figure 6:
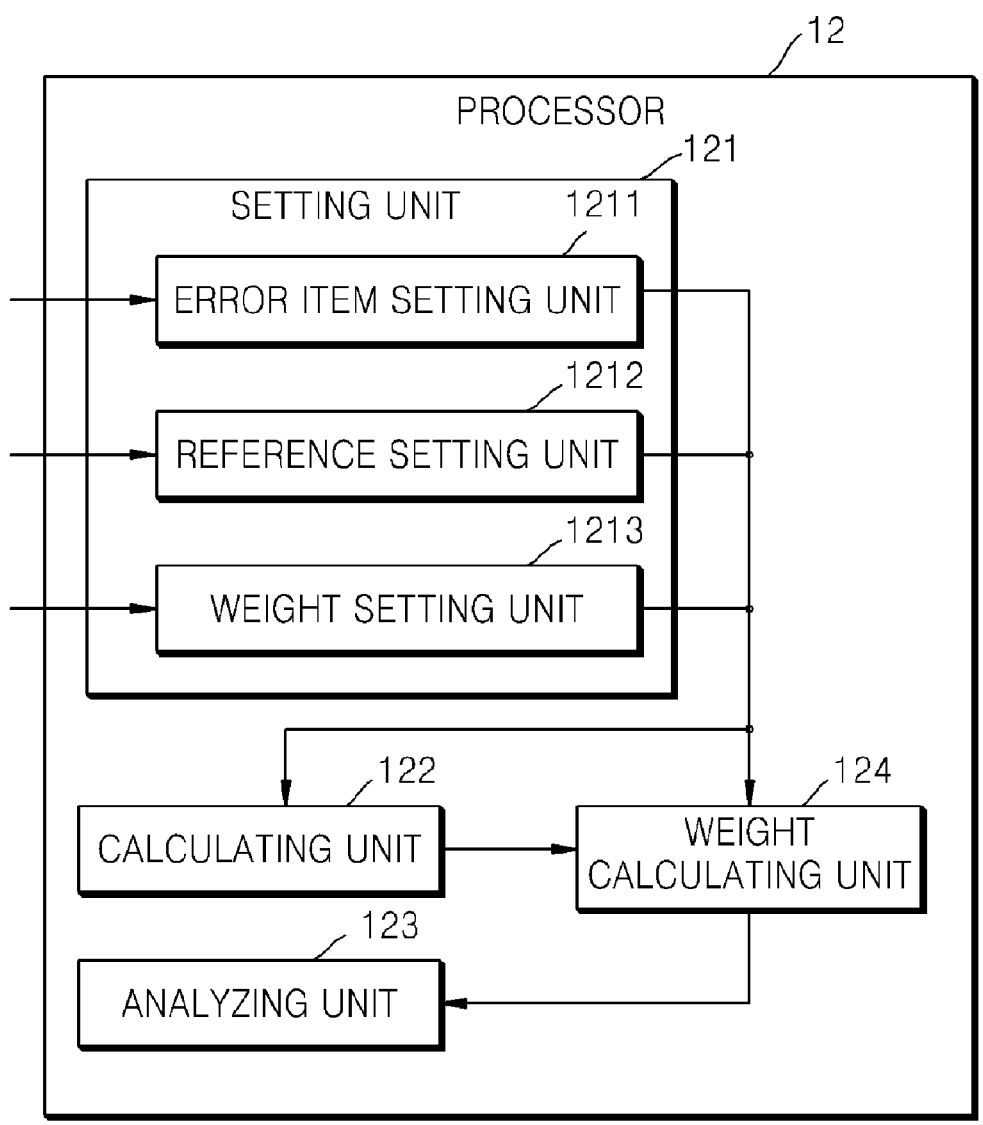
FIG. 6 is a detailed view of a processor according to another embodiment of the present general inventive concept.

FIG. 6 is a detailed view of a processor 12 according to another example embodiment of the present general inventive concept. Referring to FIG. 6, the processor 12 is similar to that of FIG. 2, except that the processor 12 of this embodiment further includes a weight calculating unit 124 and the setting unit 121 of this embodiment further includes a weight setting unit 1213. For convenience of description, it is assumed that the other elements and features of the processor 12 of FIG. 6 are substantially the same or similar to the processor 12 of FIG. 2.

Referring to FIG. 6, the weight setting unit 1213 can apply different weights to the error occurrence frequency and the error treatment time to further analyze the error severity. For example, scores of the level of each error occurrence frequency and the level of each error treatment time, weights of the error occurrence frequency and error treatment time, and a section of the error severity level can be set from the input unit 11 to provide additional information to analyze error severity.

The weight calculating unit 124 calculates an error severity value by reflecting the scores and weights set in the weight setting unit 1213 with respect to the calculation results of the calculating unit 122. The analyzing unit 123 analyzes the severity of each of the errors based on one of the error occurrence frequency and the error treatment time on which the weights are put.

For example, as illustrated in the following Tables 1a and 1b, the weight setting unit 1213 sets the scores and weights for the error occurrence frequency and error treatment time to determine the error severity.

TABLE 1a

| ERROR OCCURRENCE FREQUENCY | SCORE | WEIGHT |
|---|---|---|
| HIGH | 1 | 0.7 |
| LOW | 0 | |

TABLE 1b

| ERROR TREATMENT TIME | SCORE | WEIGHT |
|---|---|---|
| LONG | 1 | 0.3 |
| SHORT | 0 | |

Referring to Table 1a, when the error occurrence frequency is HIGH, the weight setting unit 1213 sets the score as 1 and sets the weight as 0.7; however when the error occurrence frequency is LOW, the weight setting unit 1213 sets the score as 0. Referring to Table 1b, when the error treatment time is LONG, the weight setting unit 1213 sets the score as 1 and sets the weight as 0.3; however when the error treatment time is SHORT, the weight setting unit 1213 sets the score as 0. Here, it will be understood by those of ordinary skill in the art that the scores and weight may vary.

When the weight setting unit 1213 performs the setting, the weight calculating unit 124 calculates the error severity value by reflecting the scores and weights for the levels of the error occurrence frequency and error treatment time. The error severity value is attained by the following Equation 1.

$$\text{Error severity value} = (\text{Score of error occurrence frequency} \times \text{Weight of error occurrence frequency}) + (\text{Score of error treatment time} \times \text{Weight of error treatment time}) \quad [\text{Equation 1}]$$

For example, when the error occurrence frequency is HIGH and the error treatment time is SHORT, the error severity value becomes $(1 \times 0.7) + (0 \times 0.3) = 0.7$. That is, the weight calculating unit 124 calculates the error severity value for each case as shown in the following Table 2.

TABLE 2

| ERROR OCCURRENCE FREQUENCY | ERROR TREATMENT TIME | ERROR SEVERITY VALUE |
|---|---|---|
| HIGH | LONG | 1 * 0.7 + 1 * 0.3 = 1.0 |
| HIGH | SHORT | 1 * 0.7 + 0 * 0.3 = 0.7 |
| LOW | LONG | 0 * 0.7 + 1 * 0.3 = 0.3 |
| LOW | SHORT | 0 * 0.7 + 0 * 0.3 = 0.7 |

Referring to FIG. 2, the weight calculating unit 124 calculates the error severity value by reflecting the scores and weights for the levels of the error occurrence frequency and error treatment time as described above.

The weight setting unit 1213 sets the ranges or sections of the levels of the error severity. As described in connection with FIG. 2, the storage unit 15 stores therein information regarding the error severity corresponding to the various sections defining the levels of error severity. For example, the storage unit 15 can store therein the sections of the levels of the error severity using the ranges illustrated in the following Table 3.

TABLE 3

| SECTION OF LEVEL OF ERROR SEVERITY | LEVEL OF ERROR SEVERITY |
|---|---|
| 0.8~1.0 | Severe |
| 0.4~0.7 | Warning |
| 0.0~0.3 | Slight |

Here, the analyzing unit 123 determines the error severity by determining a section where the level of the error severity value calculated by the weight calculating unit 124 is contained. For example, when the error occurrence frequency is HIGH and the error treatment time is SHORT, the error severity value calculated by the weight calculating unit 124 is $(1*0.7)+(0*0.3)=0.7$ as shown in Table 2 and thus the analyzing unit 123 determines the error severity level as "Warning", which is where the error severity value 0.7 is included. That is, the error severity levels corresponding to the error severity values are as shown in the following Table 4.

TABLE 4

| ERROR OCCURRENCE FREQUENCY | ERROR TREATMENT TIME | ERROR SEVERITY VALUE | ERROR SEVERITY |
|---|---|---|---|
| HIGH | LONG | 1 * 0.7 + 1 * 0.3 = 1.0 | Severe |
| HIGH | SHORT | 1 * 0.7 + 0 * 0.3 = 0.7 | Warning |
| LOW | LONG | 0 * 0.7 + 1 * 0.3 = 0.3 | Slight |
| LOW | SHORT | 0 * 0.7 + 0 * 0.3 = 0.7 | Slight |

The analyzing unit 123 performs the analyzing depending on the determined levels of the error severity and the output unit 14 outputs the analyzed results.

According to this embodiment, it is possible that the error severity may be analyzed in a different way than the previous embodiment. For example, in the previous embodiment, when the error occurrence frequency is LOW and the error treatment time is LONG, the error severity is determined as "Warning." However, in this embodiment, when the error occurrence frequency is LOW and the error treatment time is LONG, the error severity is determined as "Slight" due to application of the weight to the respective values. Accordingly, the user can variously analyze the error severity by determining if she/he sets the weight in response to the use environment of the printing accounting server 1.

Figure 7:
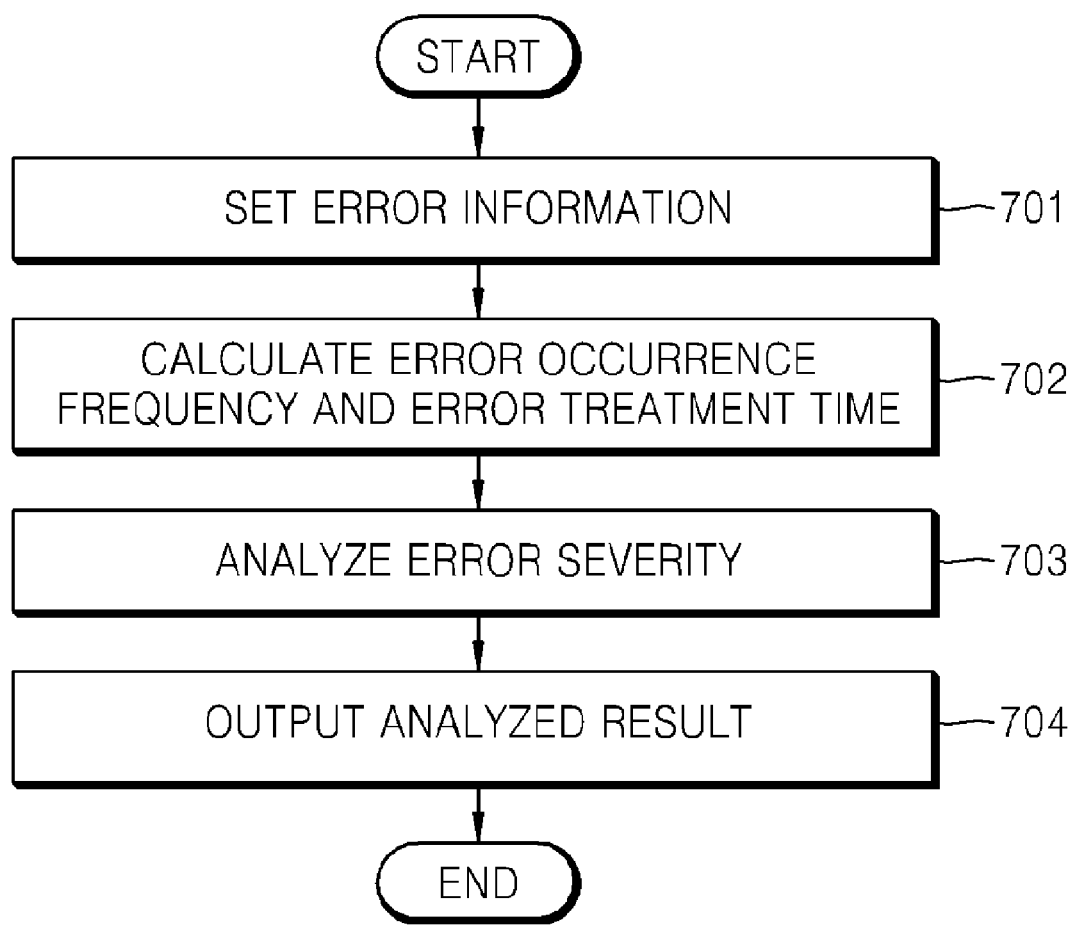
FIG. 7 is a flowchart illustrating a method of managing errors of the image forming apparatuses, according to an embodiment of the present general inventive concept.

FIG. 7 is a flowchart illustrating a method of managing errors of image forming apparatuses 2, according to an embodiment of the present general inventive concept. Referring to FIG. 7, operations of the method of managing the errors of the image forming apparatuses 2 are processed in time series in the printing account server 1 of FIG. 2. Here, contents and features of the printing account server 1 of FIG. 2 may be applied to the method of managing the errors of the image forming apparatuses. Since contents and features of the printing account server 1 were described above in connection with FIG. 2, a detailed description of same will not be repeated for convenience of description.

In operation 701, the data sending/receiving unit 13 collects information regarding errors disrupting the normal operation of the image forming apparatuses 2.

In operation 702, the calculation unit 122 calculates an occurrence frequency of each of the errors of the image forming apparatuses 2 and a treatment time taken for treating each of the errors of the image forming apparatuses 2 using the collected error information.

In operation 703, the analyzing unit 123 analyzes the severity of each of the errors based on at least one of the error occurrence frequency and the error treatment time.

In operation 704, the output unit 14 outputs the analysis results of the severity of each of the errors.

Figure 8:
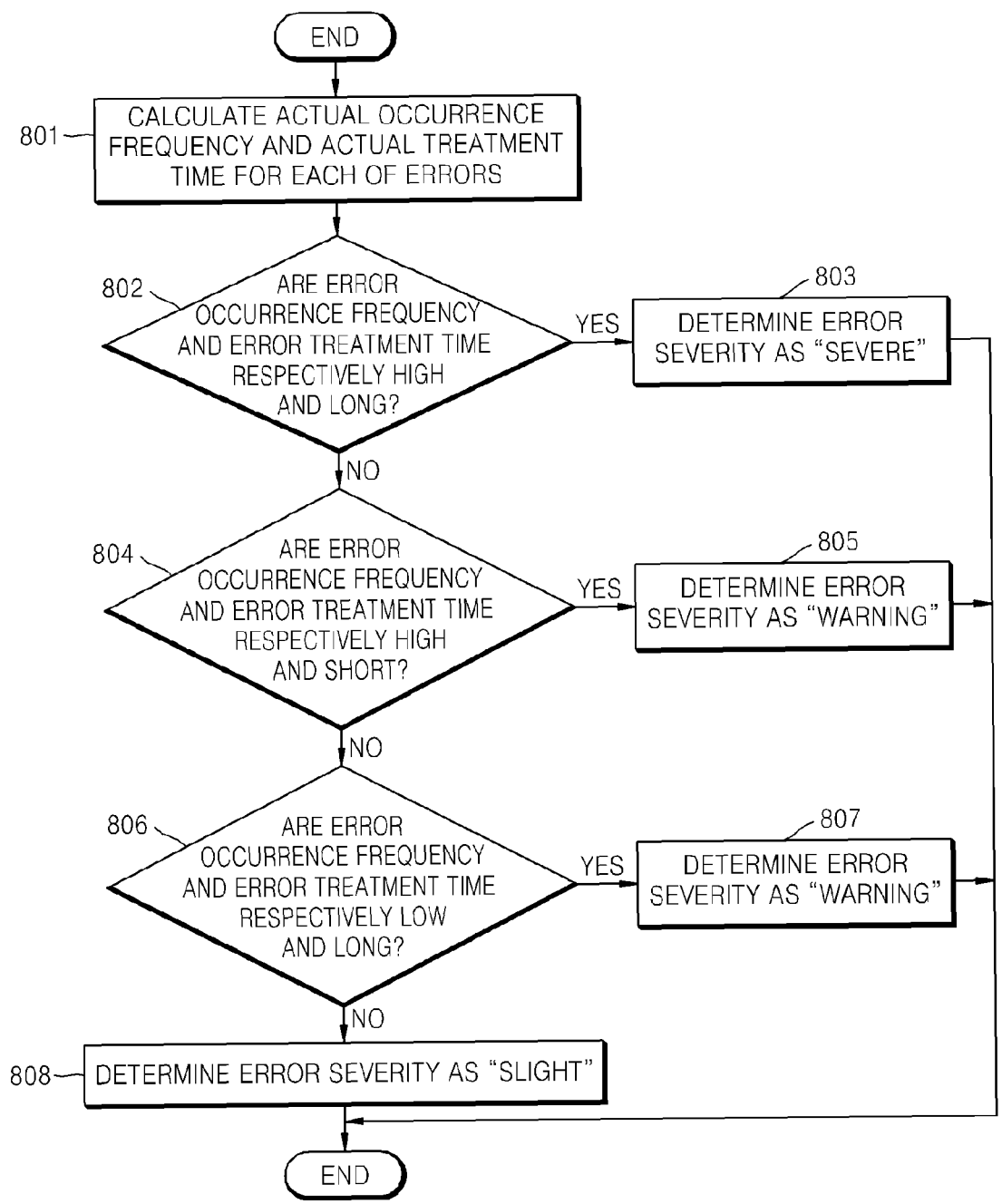
FIG. 8 is a flowchart illustrating a method of analyzing error severity of FIG. 7, according to an embodiment of the present general inventive concept.

FIG. 8 is a flowchart illustrating a method of analyzing the error severity of FIG. 7, according to an embodiment of the present general inventive concept.

In operation 801, the calculating unit 122 calculates an actual frequency for each of the errors and an actual treatment time for each of the errors based on the set references. That is, the calculating unit 122 calculates the actual frequency for each of the errors for the set reference period and the actual treatment time for each of the errors for treating each of the errors one time.

In operations 802 to 808, the analyzing unit 123 compares the actual frequency and the actual treatment time that are calculated by the calculating unit 122 with the set reference frequency and the set reference time, respectively. From the comparison results, the analyzing unit 123 determines the levels of the error occurrence frequency and error treatment time and further determines the error severity based on the determined error occurrence frequency and error treatment time.

That is, in operation 802, the analyzing unit 123 determines if the error occurrence frequency is HIGH and if the error treatment time is LONG.

In operation 803, if it is determined in operation 802 that the error occurrence frequency is HIGH and the error treatment time is LONG, the analyzing unit 123 determines the level of the error severity as "Severe."

In operation 804, if it is determined in operation 802 that the error occurrence frequency is not HIGH and the error treatment time is not LONG, the analyzing unit 123 determines if the error occurrence frequency is HIGH and if the error treatment time is SHORT.

In operation 805, when it is determined in operation 804 that the error occurrence frequency is HIGH and the error treatment time is SHORT, the analyzing unit 123 determines the level of the error severity as "Warning."

In operation 806, if it is determined in operation 802 that the error occurrence frequency is not HIGH and the error treatment time is not SHORT, the analyzing unit 123 determines if the error occurrence frequency is LOW and if the error treatment time is LONG.

In operation 807, if it is determined in operation 804 that the error occurrence frequency is LOW and the error treatment time is LONG, the analyzing unit 123 determines the level of the error severity as "Warning."

In operation 808, if it is determined in operation 802 that the error occurrence frequency is not LOW and the error treatment time is not LONG, the analyzing unit 123 determines the level of the error severity as "Slight."

Figure 9:
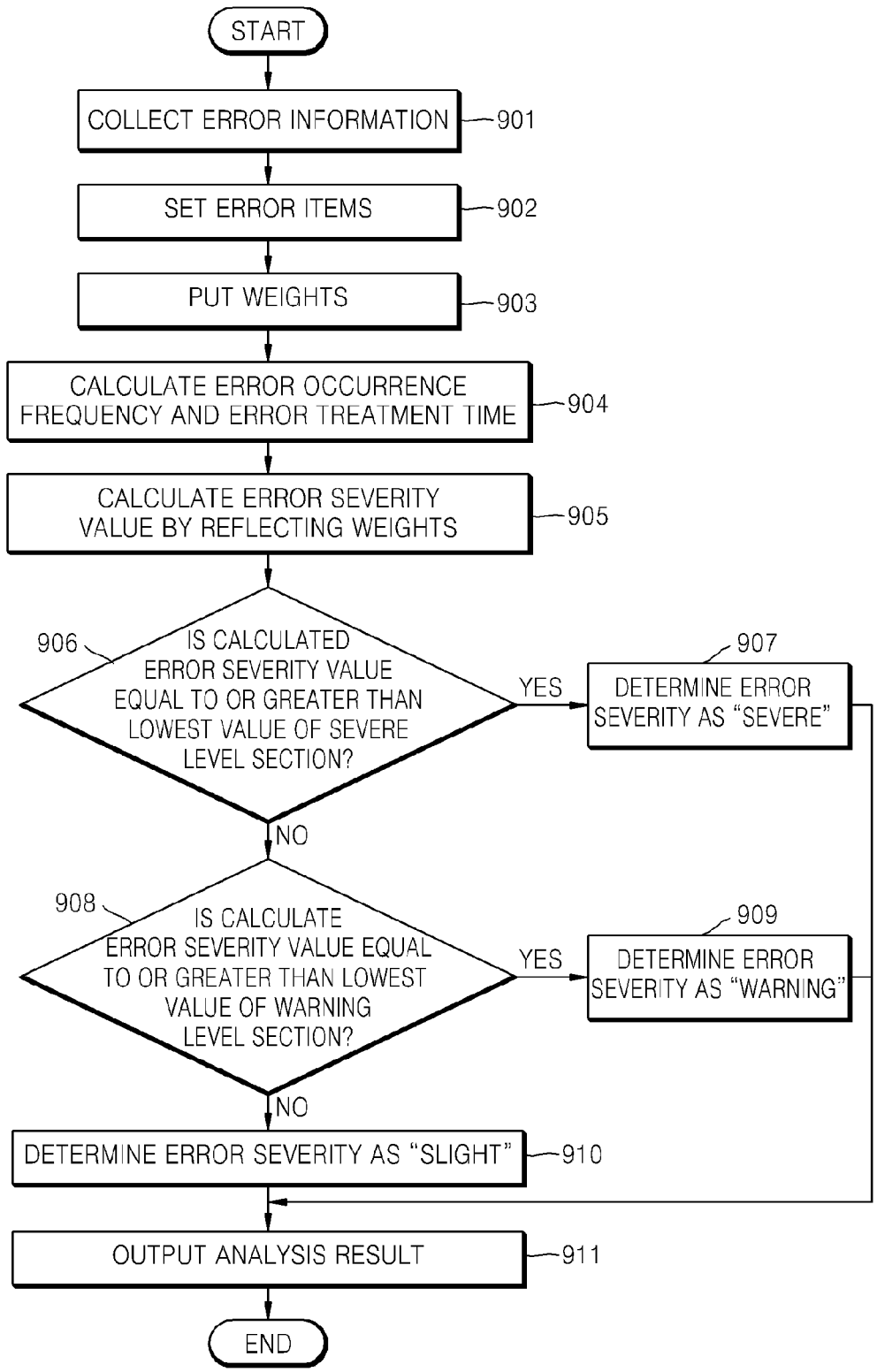
FIG. 9 is a flowchart illustrating a method of managing errors of the image forming apparatuses, according to another embodiment of the present general inventive concept.

FIG. 9 is a flowchart illustrating a method of managing errors of the image forming apparatuses 2, according to another embodiment of the present general inventive concept.

In operation 901, the data sending/receiving unit 13 collects information regarding errors disrupting the normal operation of the image forming apparatuses 2.

In operation 902, the error item setting unit 1211 sets an error item among the collected information regarding errors, which will be managed in a server managing the image forming apparatuses 2.

In operation 903, the weight setting unit 1213 puts different weights on the error occurrence frequency and the error treatment time.

In operation 904, the calculating unit 122 calculates an actual frequency for each of the errors and an actual treatment time for each of the errors based on the set references.

In operation 905, the weight calculating unit 124 calculates an error severity value by reflecting the scores and weights set by the weight setting unit 1213 for the calculated results of the calculating unit 122.

In operations 906 to 910, the analyzing unit 123 determines the error severity by determining an error severity level section in which the error severity value calculated by the weight calculating unit 124 falls.

That is, in operation 906, the analyzing unit 123 determines the error severity level section in which the error severity value is contained.

In operation 907, if it is determined in operation 906 that the error severity value is contained in the error severity level section "Severe," the analyzing unit 123 determines the error severity as "Severe."

In operation 908, if it is determined in operation 906 that the error severity value is not contained in the error severity level section "Severe," the analyzing unit 123 determines if the error severity value is contained in the error severity level section "Warning."

In operation 909, if it is determined in operation 908 that the error severity value is contained in the error severity level section "Warning," the analyzing unit 123 determines the error severity as "Warning."

In operation 910, if it is determined in operation 908 that the error severity value is not contained in the error severity level section "Warning," the analyzing unit 123 determines the error severity as "Slight."

In operation 911, the output unit 14 outputs the analysis results for the severity of each of the errors.

According to the exemplary embodiments, since the system automatically calculates the error severity of the errors occurring in the image forming apparatuses based on the set reference information and automatically reports the calculated error severity to the manager such as the service provider and the customer manager, the manager's fault that may be incurred when the manager manually designates the error severity of many error items can be prevented. Further, since the error severity is accurately reported, the manager can accurately diagnose the errors and thus the error treatment time can be shortened, thereby improving customer satisfaction. Particularly, when many image forming apparatuses are operated and managed in a B2B environment and the errors simultaneously occur in the image forming apparatuses, priority order for the error items and severity order for the image forming apparatuses are accurately provided and thus the manager can immediately take just and proper measures to manage the errors of the image forming apparatuses.

The present general inventive concept can also be embodied as computer-readable codes on a computer-readable medium. The embodiments of the present general inventive concept may be written as computer programs and may be implemented in general-use digital computers that execute the programs using computer-readable recording media. The information used in the aforementioned embodiments may be recorded in computer-readable recording media through various members. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present invention have been illustrated and described, it would be appreciated by those skilled in the art that changes may be made in these embodiments without departing from the principles and spirit of the general inventive concept, the scope of which is defined in the claims and their equivalents.

What is claimed is:

1. A method of managing errors of at least one image forming apparatus at a server managing the at least one image forming apparatus, the method comprising:
    collecting information regarding the errors of the at least one image forming apparatus;
    calculating an occurrence frequency of each of the errors and a treatment time taken to treat each of the errors by using the collected information;
    analyzing the severity of each of the errors based on at least one of the occurrence frequency and the treatment time; and
    outputting a severity analysis result for each of the errors,
    wherein the analyzing of the severity comprises comparing the calculated error occurrence frequency and the calculated error treatment time with an error occurrence frequency reference and an error treatment time reference, respectively, and analyzing the severity of each of the errors by determining a level of severity of each of the errors depending on the comparison result.

2. The method of claim 1, wherein the analyzing of the severity comprises analyzing the severity of each of the errors by determining a level of the severity of each of the errors in proportion to levels of the occurrence frequency and treatment time.

3. The method of claim 2, wherein the outputting of the severity analyzing result comprises outputting a report in which the errors are sorted in order of the level of the severity.

4. The method of claim 2, wherein the outputting of the severity analyzing result comprises outputting a report in which the image forming apparatuses are sorted in order of the number of errors having a higher severity level.

5. The method of claim 1, further comprising setting the error occurrence frequency reference and the error treatment time reference.

6. The method of claim 1, further comprising applying different weights on the calculated error occurrence frequency and the calculated error treatment time, wherein the analyzing of the severity comprises analyzing the severity of each of the errors based on at least one of the error occurrence frequency and error treatment time on which the weights are applied.

7. The method of claim 1, further comprising setting an error item among the collected error information, which will be managed in a server managing the at least one image forming apparatus, wherein the calculating of the occurrence frequency comprises calculating the frequency of each of the errors that will be contained in the set error item and the time taken for treating each of the errors.

8. A computer readable recording medium having recorded thereon a computer program to execute a method of managing errors of at least one image forming apparatus at a server managing the at least one image forming apparatus, the method comprising:
    collecting information regarding the errors of the at least one image forming apparatus;
    calculating an occurrence frequency of each of the errors and a treatment time taken to treat each of the errors by using the collected information;
    analyzing the severity of each of the errors based on at least one of the occurrence frequency and the treatment time; and
    outputting a severity analysis result for each of the errors,
    wherein the analyzing of the severity comprises comparing the calculated error occurrence frequency and the calculated error treatment time with an error occurrence frequency reference and an error treatment time reference, respectively, and analyzing the severity of each of the errors by determining a level of the severity of each of the errors depending on the comparison result.

9. A server to manage at least one image forming apparatus, comprising:
    a storage unit to collect information regarding errors of the at least one image forming apparatus and to store the collected information therein;
    a calculating unit to calculate an occurrence frequency of each of the errors and a treatment time taken to treat each of the errors using the collected information;
    an analyzing unit to analyze severity of each of the errors based on at least one of the occurrence frequency and the treatment time; and
    an outputting unit to output a severity analyzing result for each of the errors,
    wherein the analyzing unit compares the calculated error occurrence frequency and the calculated error treatment time with an error occurrence frequency reference and an error treatment time reference, respectively, and analyzing the severity of each of the errors by determining a level of the severity of each of the errors depending on the comparison result.

10. The server of claim 9, wherein the analyzing unit analyzes the severity of each of the errors by determining a level of the severity of each of the errors in proportion to levels of the occurrence frequency and treatment time.

11. The server of claim 10, wherein the outputting unit outputs a report in which the errors are sorted in order of the level of the severity.

12. The server of claim 10, wherein the outputting unit outputs a report in which the image forming apparatuses are sorted in order of the number of errors having a higher severity level.

13. The server of claim 9, further comprising a reference setting unit to set the error occurrence frequency reference and the error treatment time reference.

14. The server of claim 9, further comprising a weight setting unit to apply different weights to the calculated error occurrence frequency and the calculated error treatment time, wherein the analyzing unit analyzes the severity of each of the errors based on at least one of the error occurrence frequency and error treatment time on which the weights are applied.

15. The server of claim 9, further comprising an error item setting unit to set an error item among the collected error information, which will be managed in a server managing the at least one image forming apparatus, wherein the calculating unit calculates the frequency of each of the errors that will be contained in the set error item and the time taken to treat each of the errors.

16. A system of managing errors of at least one image forming apparatus, comprising:
    an image forming apparatus managing server to manage the at least one image forming apparatus; and
    a network to connect the at least one image forming apparatus to the image forming apparatus managing server,
    wherein the image forming apparatus managing server comprises:
        a storage unit to collect information regarding the errors disrupting normal operation of the at least one image forming apparatus and to store the collected information therein;
        a calculating unit to calculate an occurrence frequency of each of the errors and a treatment time taken to treat each of the errors using the collected information;
        an analyzing unit to analyze severity of each of the errors based on at least one of the occurrence frequency and the treatment time; and
        an outputting unit to output a severity analysis result for each of the errors,
        wherein the analyzing unit compares the calculated error occurrence frequency and the calculated error treatment time with an error occurrence frequency reference and an error treatment time reference, respectively, and analyzing the severity of each of the errors by determining a level of the severity of each of the errors depending on the comparison result.

17. The system of claim 16, wherein the analyzing unit analyzes the severity of each of the errors by determining a level of the severity of each of the errors in proportion to levels of the occurrence frequency and treatment time.

18. The system of claim 16, wherein the outputting unit outputs a report in which the errors are sorted in order of the level of the severity.

19. The system of claim 16, further comprising a weight setting unit to apply different weights on the calculated error occurrence frequency and the calculated error treatment time, wherein the analyzing unit analyzes the severity of each of the errors based on at least one of the error occurrence frequency and error treatment time on which the weights are applied.

20. A method of managing errors of an image forming apparatus at a server managing the image forming apparatus, the method comprising:
    receiving error information of the image forming apparatus;
    prioritizing the error information based on an occurrence frequency of the errors and a treatment time to solve the errors; and
    outputting a severity analysis report for each of the errors based on the occurrence frequency and the treatment time of the errors,
    wherein the prioritizing the error information comprises comparing an error occurrence reference and an error treatment reference to the occurrence frequency and the treatment time, respectively.

21. The method of claim 20, wherein the error information is received remotely from the image forming apparatus.

22. The method of claim 20, wherein the prioritizing the error information occurs immediately after the error occurs.

23. The method of claim 20, further comprising:
    setting the error occurrence reference value and the error treatment reference value.

24. The method of claim 23, wherein the prioritizing the error information further comprises:
    applying different weights to the occurrence frequency and the treatment time.

25. A printing account server to manage errors of at least one image forming apparatus, comprising:
    a receiving unit to receive error information of the image forming apparatus;
    a processor to prioritize the error information based on an occurrence frequency of the error and a treatment time to solve the errors; and
    an output unit to output a severity analysis report for each of the errors based on the occurrence frequency and the treatment time of the errors,
    wherein the processor prioritizes the error information by comparing an error occurrence reference value and an error treatment reference value to the occurrence frequency and the treatment time, respectively.

26. The printing account server of claim 25, wherein the error information is received remotely from the image forming apparatus via a network.

27. The printing account server of claim 25, wherein the processor prioritizes the error information immediately after the error occurs.

28. The printing account server of claim 25, further comprising:
    an input unit to set the error occurrence reference value and the error treatment reference value.

29. The printing account server of claim 28, wherein the processor applies different weights to the occurrence frequency and the treatment time to prioritize the error information.

* * * * *